United States Patent
Han

(10) Patent No.: US 10,205,973 B2
(45) Date of Patent: Feb. 12, 2019

(54) METHOD AND SYSTEM FOR LINKING REAL-TIME BROADCASTING WITH NON-REAL-TIME VIDEO SERVICE USING USER HISTORY INFORMATION

(71) Applicant: Alticast Corporation, Seoul (KR)

(72) Inventor: Jung Sam Han, Seoul (KR)

(73) Assignee: Alicast Corporation, Scocho-Gu (KR)

( * ) Notice: Subject to any disclaimer, the term of this patent is extended or adjusted under 35 U.S.C. 154(b) by 214 days.

(21) Appl. No.: 15/128,710

(22) PCT Filed: Dec. 26, 2014

(86) PCT No.: PCT/KR2014/012873
§ 371 (c)(1),
(2) Date: Sep. 23, 2016

(87) PCT Pub. No.: WO2015/147421
PCT Pub. Date: Oct. 1, 2015

(65) Prior Publication Data
US 2018/0220168 A1    Aug. 2, 2018

(30) Foreign Application Priority Data
Mar. 26, 2014   (KR) .................. 10-2014-0035522

(51) Int. Cl.
*H04N 21/43*    (2011.01)
*H04N 21/234*    (2011.01)
(Continued)

(52) U.S. Cl.
CPC ....... *H04N 21/234* (2013.01); *H04N 21/2393* (2013.01); *H04N 21/25866* (2013.01);
(Continued)

(58) Field of Classification Search
None
See application file for complete search history.

(56) References Cited

U.S. PATENT DOCUMENTS 7,369,743 B2   5/2008   Watkins et al.
7,394,968 B2   7/2008   Watkins
(Continued)

FOREIGN PATENT DOCUMENTS

EP          2587798 A1     5/2013
KR   10-2011-0114079 A    10/2011
(Continued)

OTHER PUBLICATIONS

"VideoSurf is like Shazam, but for video" (https://androidandme.com/2011/01/applications/videosurf-is-like-shazam-but-for-video/).

(Continued)

*Primary Examiner* — Cai Y Chen
(74) *Attorney, Agent, or Firm* — Harness, Dickey & Pierce, P.L.C.

(57) ABSTRACT

The method may include initiating a view of real-time broadcasting content at a broadcasting reception terminal; determining a view suspension time point in response to a user input during the real-time broadcasting; transmitting, to a history management server, view history data comprising the view suspension time point and content identification information, the transmitted view history data interacting with a non-real-time video service server; requesting the non-real-time video service server for non-real-time broadcasting content corresponding to the real-time broadcasting content; and receiving the non-real-time broadcasting content that is provided from the non-real-time video service server and corresponds to a broadcasting time after the view suspension time point. A bi-directional multimedia service free from restrictions on a place and a time may be achieved by providing a substantially real-time video service through a linkage between a real-time broadcasting and a non-real-time video service.

18 Claims, 8 Drawing Sheets

(51) Int. Cl.
*H04N 21/258* (2011.01)
*H04N 21/433* (2011.01)
*H04N 21/472* (2011.01)
*H04N 21/658* (2011.01)
*H04N 21/6587* (2011.01)
*H04N 21/239* (2011.01)
*H04N 21/488* (2011.01)
*H04N 21/643* (2011.01)

(52) U.S. Cl.
CPC ... *H04N 21/25891* (2013.01); *H04N 21/4333* (2013.01); *H04N 21/472* (2013.01); *H04N 21/47202* (2013.01); *H04N 21/47217* (2013.01); *H04N 21/4882* (2013.01); *H04N 21/64322* (2013.01); *H04N 21/6581* (2013.01); *H04N 21/6582* (2013.01); *H04N 21/6587* (2013.01)

(56) References Cited

U.S. PATENT DOCUMENTS

| | | |
|---|---|---|
| 8,005,344 B2 | 8/2011 | Watkins |
| 8,793,739 B2 | 7/2014 | Ko et al. |
| 2003/0140083 A1 | 7/2003 | Watkins |
| 2003/0140350 A1 | 7/2003 | Watkins et al. |
| 2008/0222679 A1 | 9/2008 | Watkins |
| 2010/0262986 A1 | 10/2010 | Adimatyam et al. |
| 2011/0252445 A1 | 10/2011 | Ko et al. |
| 2012/0114313 A1* | 5/2012 | Phillips ............ G11B 20/10527 386/298 |
| 2012/0167151 A1 | 6/2012 | Cho |

FOREIGN PATENT DOCUMENTS

| | | |
|---|---|---|
| KR | 10-2012-0036494 A | 4/2012 |
| KR | 10-2012-0070650 A | 7/2012 |
| WO | WO-2008-143572 A1 | 11/2008 |

OTHER PUBLICATIONS

Extended European Search Report dated Oct. 30, 2017 for the corresponding European Patent Appliation No. 14886818.5.
International Search Report PCT/ISA/210 for International Application No. PCT/KR2014/012873 dated Mar. 20, 2015.
Written Opinion of the International Searching Authority PCT/ISA/237 for International Application No. PCT/KR2014/012873 dated Mar. 20, 2015.

* cited by examiner

[FIG. 1]
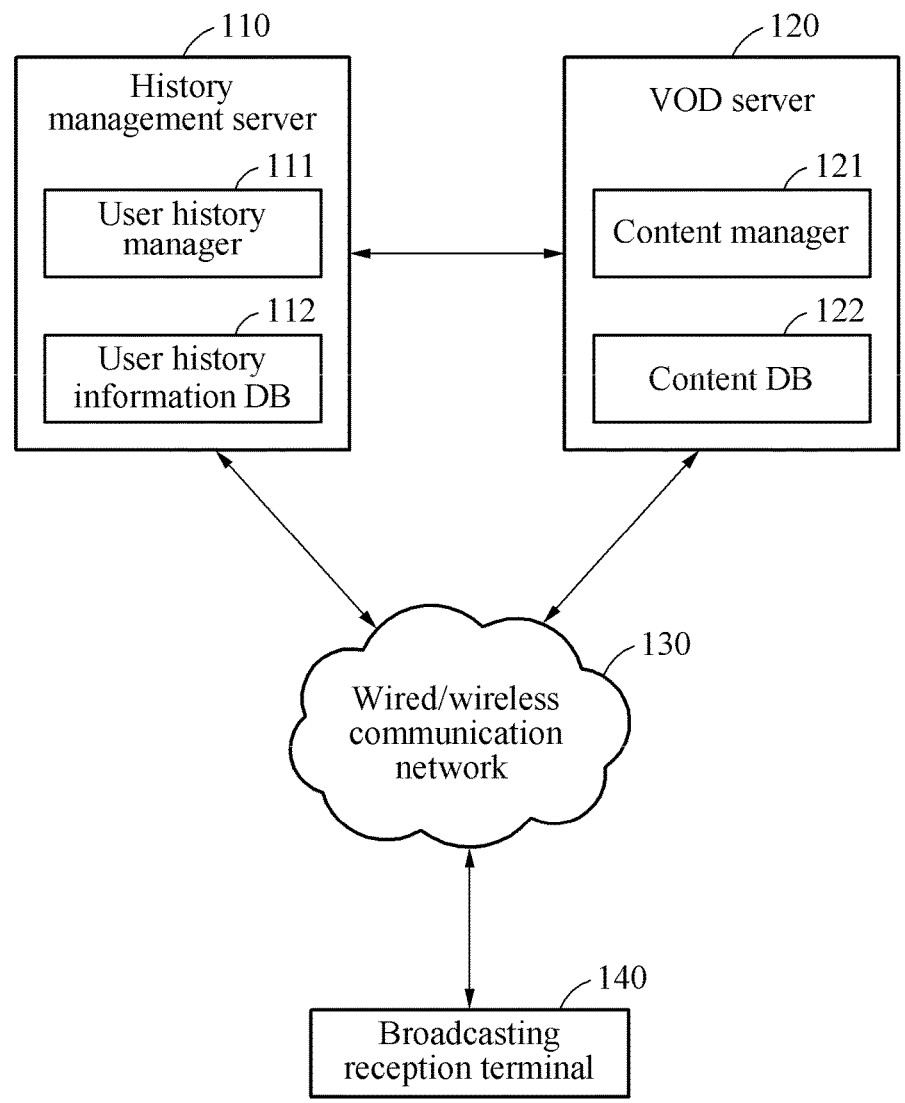

[FIG. 2]
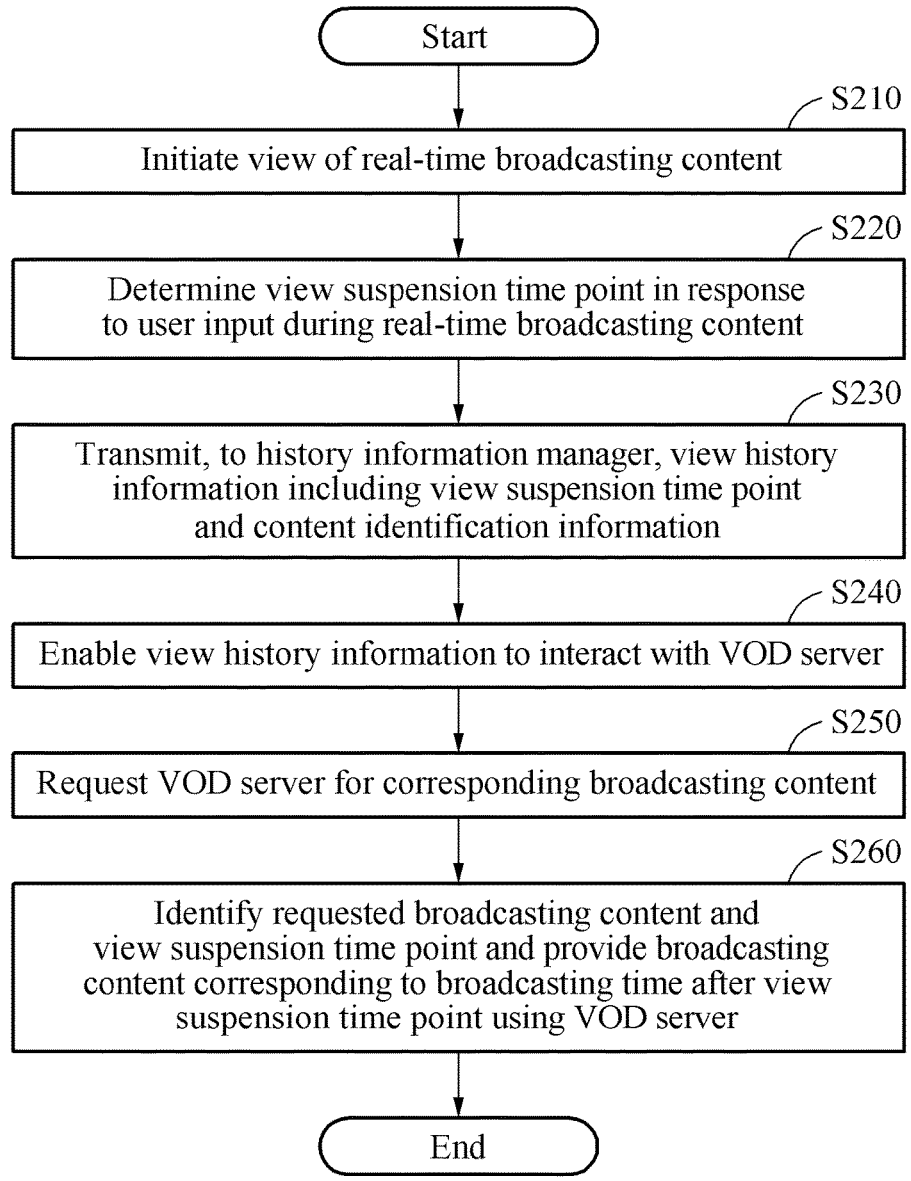

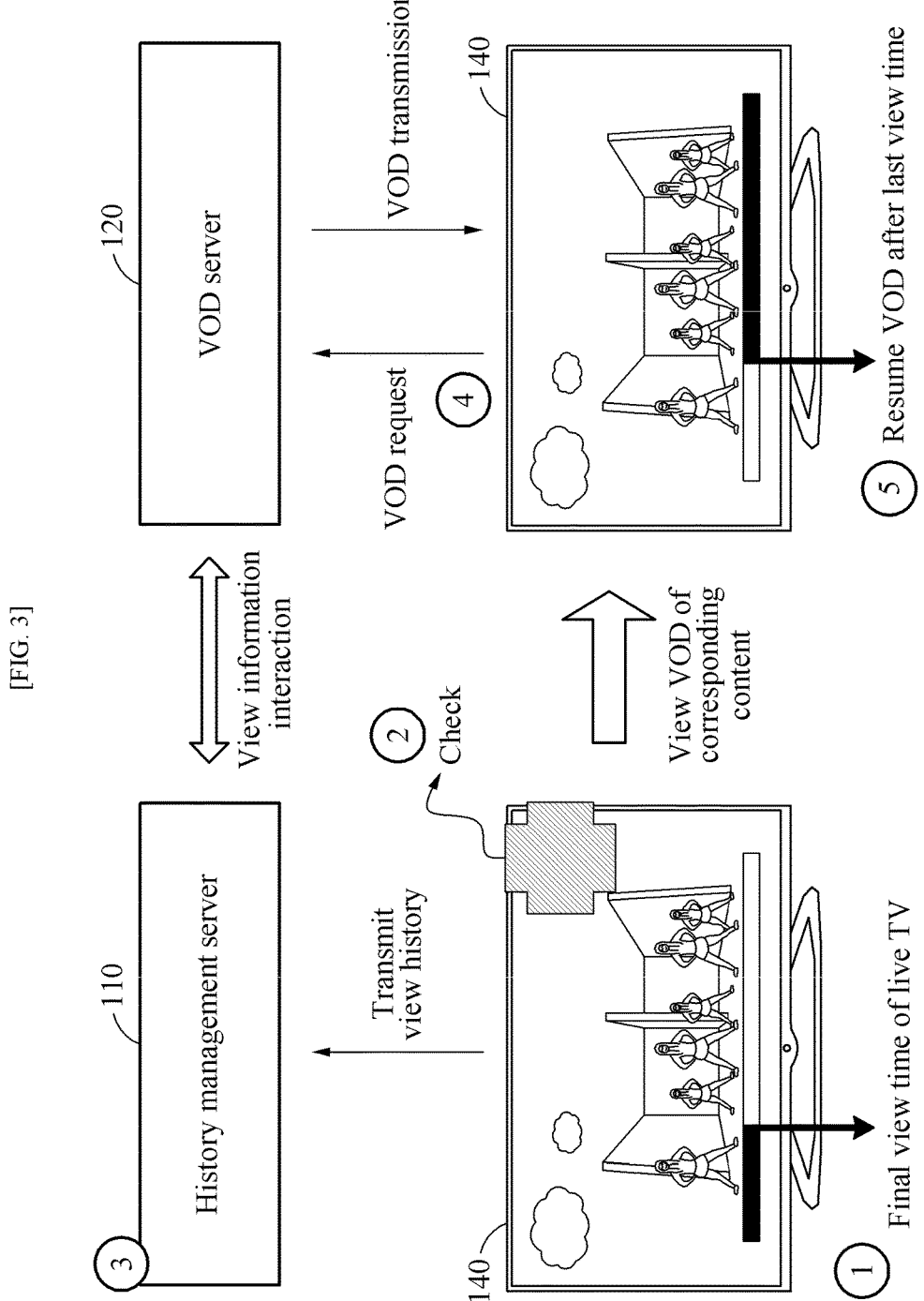

[FIG. 4]
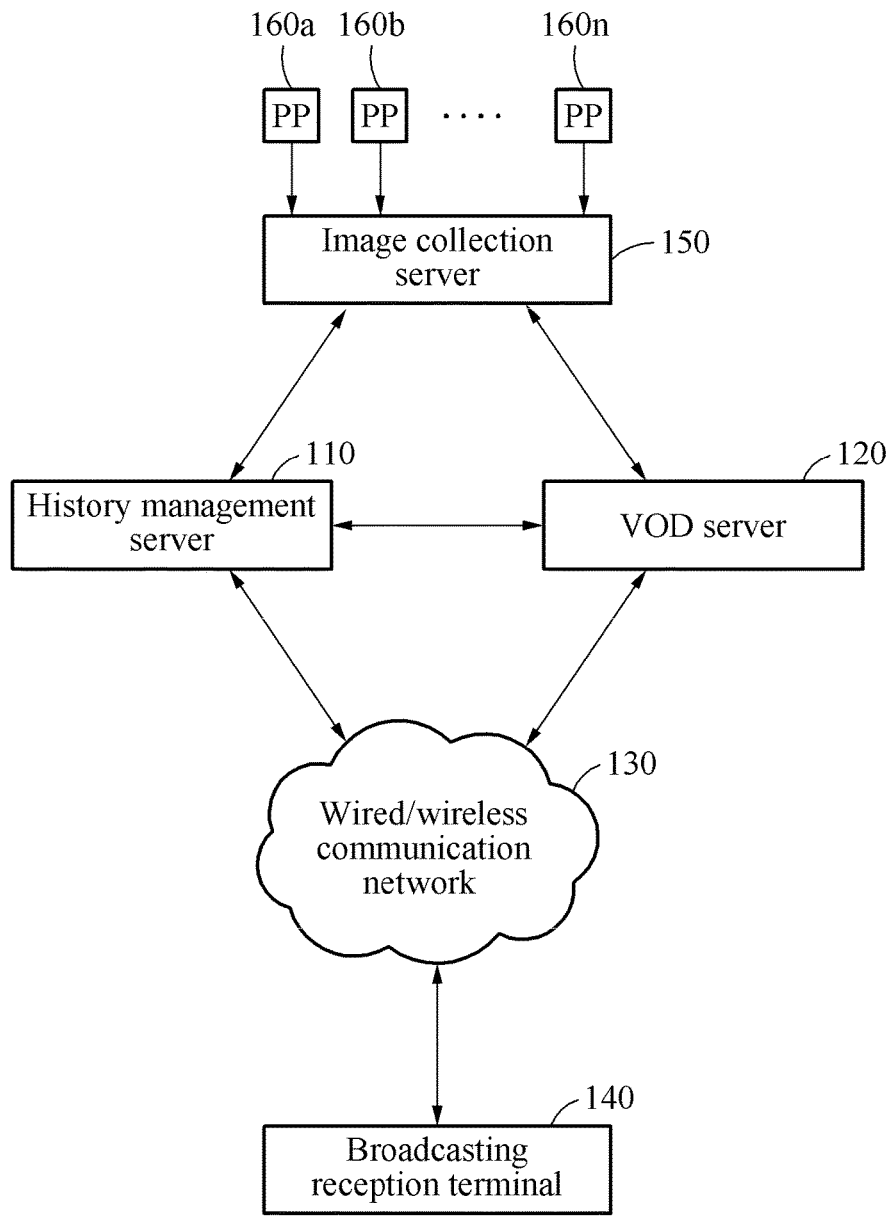

[FIG. 5]
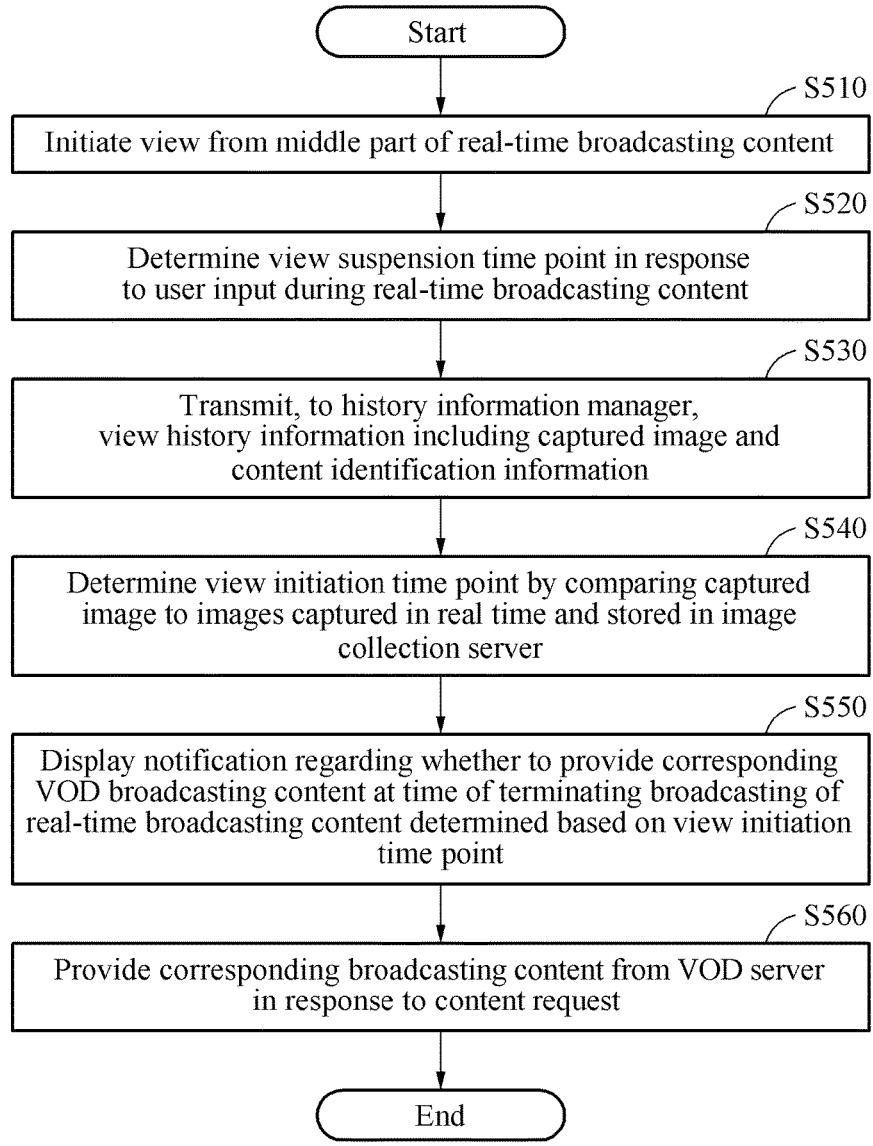

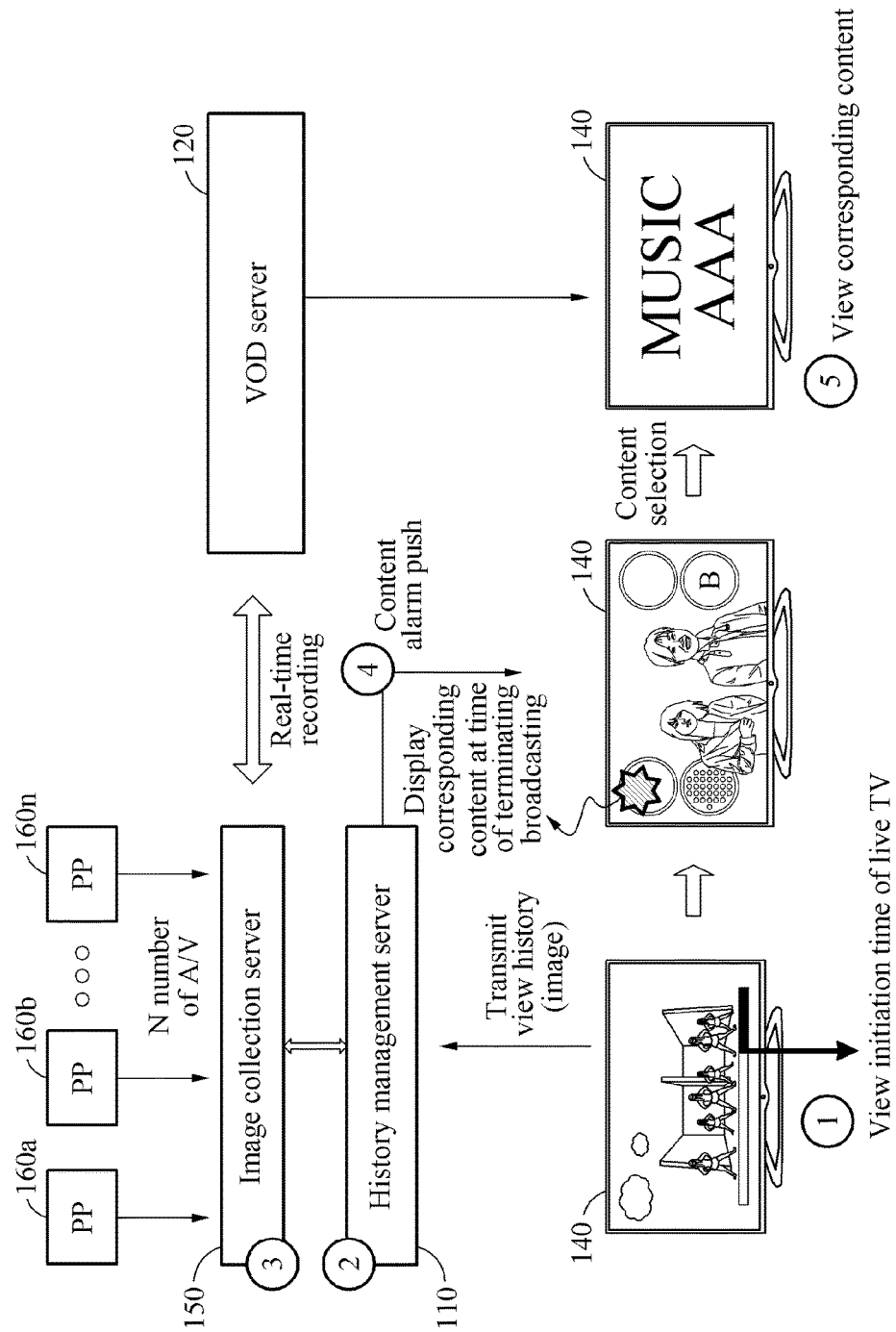
[FIG. 6]

[FIG. 7]
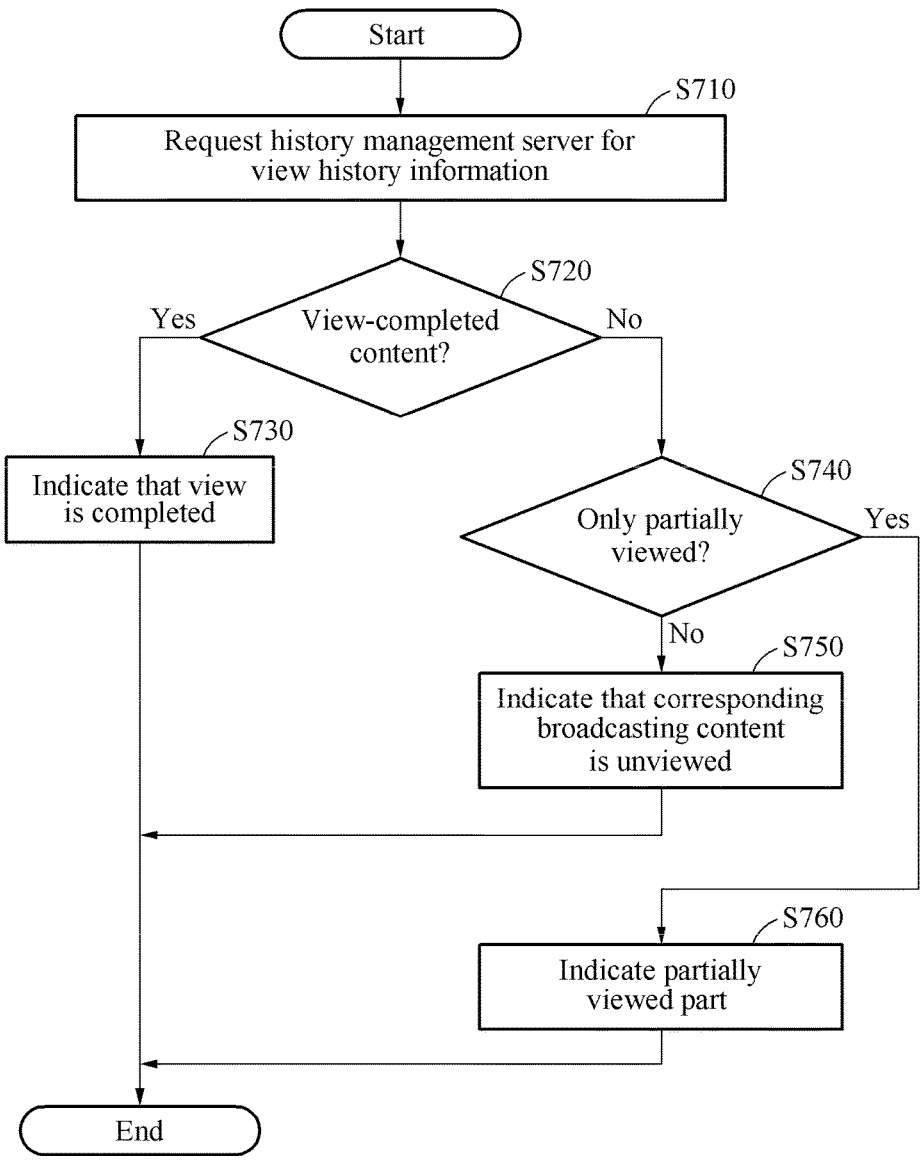

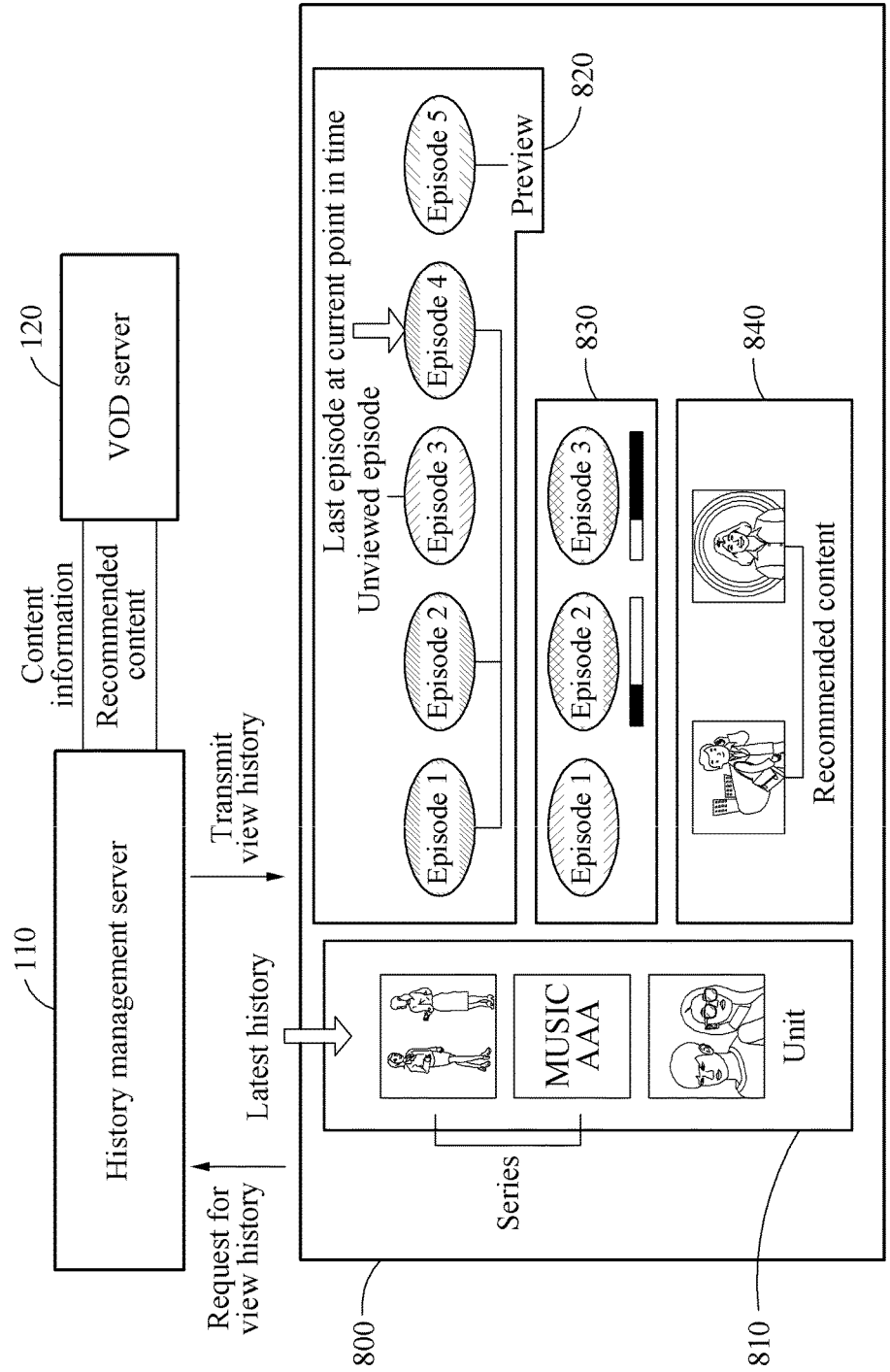

METHOD AND SYSTEM FOR LINKING REAL-TIME BROADCASTING WITH NON-REAL-TIME VIDEO SERVICE USING USER HISTORY INFORMATION

CROSS-REFERENCE TO RELATED APPLICATIONS

This application is the U.S. National Phase application of PCT Application No. PCT/KR2014/012873 filed on Dec. 26, 2014, which claims priority to Korean Patent Application No. 10-2014-0035522 filed on Mar. 26, 2014, the entire contents of each of which are incorporated herein by reference.

TECHNICAL FIELD

The present invention relates to a linkage between a real-time broadcasting and a non-real-time video service, and more particularly, to a method and system for linking a real-time broadcasting with a non-real-time video service using user history information.

This work was supported by the ICT R&D program of MSIP/IITP. [10041891, Development on Community Broadcast Technology based on MaaS (Media as a Service) providing Smart Convergence Service]

RELATED ART

With the development of communication technology, a uni-directional multimedia service using a video receiving device or a video playback device, such as a television (TV) and a video tape recorder (VCR), for example, has been reorganized as a bi-directional multimedia service capable of applying a user feedback.

A representative bi-directional multimedia service, for example, a video on demand (VOD) refers to a video service that enables a user to view a desired program at a desired time through a computer or a television connected over a communication network. Typically, a video receiving device such as a TV may receive the video service through a set-top box. Also, an Internet protocol TV (IPTV) service is currently provided to provide a more efficient bi-directional multimedia service through an Internet network. To use such an IPTV broadcasting service, the video receiving device such as a TV may connect to the Internet network through an IPTV set-top box and may use a bi-directional multimedia service.

Meanwhile, with the development of the bi-directional multimedia service, users are also demanding a high level of service. Instead of selecting and viewing content from among contents provided from an existing VOD service, users desire to view a real-time broadcasting free from restrictions on a place and a time. However, the existing VOD service just prepares, as contents, dramas, entertainment programs, and the like, which have been broadcasted in real time through airwaves, and then provides a replay service about the prepared contents. Also, users desire a multimedia service capable of conveniently and intuitively referring to and viewing contents viewed or to be viewed by intelligently managing and providing a view history.

Accordingly, there is a need for a video service for linking a real-time broadcasting with a non-real-time video service such as a VOD and also for a bi-directional multimedia service that enables users to conveniently and intuitively manage a view history.

DESCRIPTION OF INVENTION

Subjects

The present invention provides a method and system for linking a real-time broadcasting with a non-real-time video service using user history information.

Solutions

According to an embodiment of the present invention, there is provided a method of linking a real-time broadcasting with a non-real-time video service. The method may include: initiating a view of real-time broadcasting content at a broadcasting reception terminal; determining a view suspension time point in response to a user input during the real-time broadcasting; transmitting, to a history management server, view history data including the view suspension time point and content identification information, the transmitted view history data interacting with a non-real-time video service server; requesting the non-real-time video service server for non-real-time broadcasting content corresponding to the real-time broadcasting content; and receiving the non-real-time broadcasting content that is provided from the non-real-time video service server and corresponds to a broadcasting time after the view suspension time point.

According to another embodiment of the present invention, there is provided a method of linking a real-time broadcasting with a non-real-time video service. The method may include: initiating a view from a middle part of real-time broadcasting content being broadcasted at a broadcasting reception terminal; capturing a screen image of the real-time broadcasting content at the time of initiating the view; transmitting view history data including a captured image and content identification information to a history management server, the transmitted view history data interacting with a non-real-time video service server; determining a view initiation time point by comparing an image transmitted to the history management server to an image of the real-time broadcasting content captured in real time and stored in an image collection server; displaying a notification regarding whether to provide non-real-time broadcasting content corresponding to the real-time broadcasting content at the time of terminating a broadcasting of the real-time broadcasting content determined based on the view initiation time point; and requesting the non-real-time video service server for a content view such that the non-real-time broadcasting content corresponding to the real-time broadcasting content is provided.

According to still another embodiment of the present invention, there is provided a method of providing view history information. The method may include: receiving, by a history management server, a request for view history information from a broadcasting reception terminal; determining whether a view of broadcasting content associated with the broadcasting reception terminal is completed; determining whether the broadcasting content associated with the broadcasting reception terminal is partially viewed broadcasting content, when the view of the broadcasting content associated with the broadcasting reception terminal is uncompleted; and providing the view history information to the broadcasting reception terminal together with information including a partially viewed part, when the broadcasting content associated with the broadcasting reception terminal is the partially viewed broadcasting content. Also, the view history information created with respect to real-time broadcasting content may interact with non-real-time broadcasting content corresponding to the real-time broadcasting content by the history management server.

According to still another embodiment of the present invention, there is provided a system for linking a real-time broadcasting with a non-real-time video service. The system may include: a broadcasting reception terminal configured to initiate a view of real-time broadcasting content, to determine a view suspension time point in response to a user input during the real-time broadcasting, and to transmit, to a history management server, view history data including the view suspension time point and content identification information; the history management server configured to manage and store view history information of the broadcasting reception terminal, and to receive the view history data from the broadcasting reception terminal so that the view history data interacts with a non-real-time video service server; and the non-real-time video service server configured to create non-real-time broadcasting content corresponding to the real-time broadcasting content, to identify the non-real-time broadcasting content corresponding to the real-time broadcasting content based on the interacted view history data, to determine a designated time point of the non-real-time broadcasting content corresponding to the view suspension time point, and to provide the non-real-time broadcasting content corresponding to a broadcasting time after the view suspension time point in response to a request for the non-real-time broadcasting content corresponding to the real-time broadcasting content from the broadcasting reception terminal.

According to still another embodiment of the present invention, there is provided a history management server for linking a real-time broadcasting with a non-real-time video service. The history management server may include: a user history manager configured to manage view history information associated with a view of broadcasting content of a broadcasting reception terminal, and to enable an interaction between the view history information and a non-real-time video service server; and a user history information database configured to classify and store the view history information. Also, the user history manager may be further configured to receive, from the broadcasting reception terminal, view history data including a view suspension time point and content identification information in response to a view suspension by the broadcasting reception terminal after a view of real-time broadcasting content is initiated by the broadcasting reception terminal, and to enable an interaction between the non-real-time video service server and the view history data so that the non-real-time video service server configured to create non-real-time broadcasting content corresponding to the real-time broadcasting content is capable of providing the non-real-time broadcasting content corresponding to a broadcasting time after the view suspension time point, in response to a request of the broadcasting reception terminal.

Other aspects, advantages, and features of the present invention will become more apparent based on the following sections: contents disclosed in the entire application specification including a brief description of the drawings, the detailed description, and the claims.

Effects of the Invention

According to embodiments of the present invention, it is possible to provide a bi-directional multimedia service free from restrictions on a place and a time by linking a real-time broadcasting with a non-real-time video service and by providing a substantially real-time video service.

Also, according to embodiments of the present invention, although a user suspends a view of real-time broadcasting content, the user may resume and thereby view the view-suspended content substantially in real time. In addition, even with respect to real-time broadcasting content from which a middle part the user has started to view, the user may view again the corresponding content substantially in real time.

Also, according to embodiments of the present invention, it is possible to conveniently and intuitively provide users with view history information including information regarding whether broadcasting content is viewed and partially viewed information. In addition, view history information created with respect to real-time broadcasting content is enabled to interact with non-real-time broadcasting content.

BRIEF DESCRIPTION OF THE DRAWINGS

FIG. 1 is a diagram illustrating an example of a system for linking a real-time broadcasting with a video on demand (VOD) according to an embodiment of the present invention.

FIG. 2 is a flowchart illustrating an example of a method of linking a real-time broadcasting with a VOD according to an embodiment of the present invention.

FIG. 3 illustrates an example of a service flow for linking a real-time broadcasting with a VOD according to an embodiment of the present invention.

FIG. 4 illustrates an example of a system for linking a real-time broadcasting with a VOD according to another embodiment of the present invention.

FIG. 5 is a flowchart illustrating an example of a method of linking a real-time broadcasting with a VOD according to another embodiment of the present invention.

FIG. 6 is a diagram illustrating an example of a service flow for linking a real-time broadcasting with a VOD according to another embodiment of the present invention.

FIG. 7 is a flowchart illustrating an example of a method of providing view history information according to an embodiment of the present invention.

FIG. 8 is a diagram illustrating an example of a screen for providing view history information according to an embodiment of the present invention.

DETAILED DESCRIPTION TO CARRY OUT THE INVENTION

Hereinafter, embodiments of the present invention will be described with reference to the accompanying drawings. Like reference numerals refer to like elements throughout although they are illustrated in different drawings. Also, when it is determined that a detailed description related to a related known function or configuration they may make the purpose of the present invention unnecessarily ambiguous in describing the present invention, the description will be omitted here.

Various aspects of the present invention are described below. The embodiments proposed herein may be configured in various embodiments. It should be understood that a predetermined structure or function proposed herein, or all of them are only examples. Those skilled in the art may understand that a single aspect proposed herein may be independently configured with other aspects and two or more aspects may be combined using various methods based on the disclosed embodiments. For example, an apparatus may be configured or a method may be implemented using a predetermined number of aspects described herein. Also, such an apparatus may be configured or such a method may be implemented using another structure or function, or the structure and the function in addition to one or more aspects described herein or aside therefrom.

A non-real-time video service described in the present specification needs to be understood as a concept that includes non-real-time broadcasting content, not a real-time broadcasting that is broadcasted through a real-time channel such as airwaves, as well as a video on demand (VOD) and content provided through an Internet protocol television (IPTV). For example, the non-real-time video service may include a VOD, a cloud streaming video (CSV), a personal video recorder (PVR) such as a network-PVR (N-PVR) and a cloud PVR, a digital video recorder (DVR) such as a network-DVR (N-DVR) and a remote storage (RS)-DVR, and the like. Hereinafter, for concise description, the technical spirit of the present invention will be described by using a VOD as an example of a non-real-time video service, using a VOD server as an example of a non-real-time video service server, and using VOD broadcasting content as an example of non-real-time broadcasting content.

FIG. 1 is a diagram illustrating an example of a system for linking a real-time broadcasting with a VOD according to an embodiment of the present invention.

Referring to FIG. 1, the system according to an embodiment of the present invention may include a history management server 110, a VOD server 120, a wired/wireless communication network 130, and a broadcasting reception terminal 140.

The history management server 110 may be configured to manage and store view history information of the broadcasting reception terminal 140. The view history information may include, for example, information for identifying a user, information for identifying content, information for identifying a terminal used to view content, information regarding whether content is viewed, a point in time at which content is viewed, and a location at which the content is viewed, however, is not limited thereto and thus, may include various other information associated with a user use history. Also, in addition to information regarding whether content is viewed, the view history information may include information regarding whether only a portion of content is viewed, for example, information about a case in which a user has viewed up to a middle part of content and a case in which a user has viewed from a middle part of content. Also, the view history information may include view history information about real-time broadcasting content, for example, content broadcasted through an airwave channel, and view history information about VOD broadcasting content provided from the VOD server 120. The history management server 110 enables the managed view history information to interact with the VOD server 120 for a linkage between a real-time broadcasting and a VOD. To this end, the history management server 110 may include a user history manager 111 configured to manage view history information and to enable an interaction between the view history information and the VOD server 120, and a user history information database (DB) 112 configured to classify and store the view history information. An operation of the history management server 110 will be further described below.

The VOD server 120 may be configured to provide requested VOD content to the broadcasting reception terminal 140 of a user or a VOD subscriber. Also, the VOD server 120 may be provided with view history information from the history management server 110, which is interacted for a linkage between the real-time broadcasting and the VOD, and may create VOD broadcasting content corresponding to real-time broadcasting content by recording and coding the real-time broadcasting content in real time. Such interacted view history information may be used to provide VOD content from the VOD server 120 to the broadcasting reception terminal 140. To this end, the VOD server 120 may include a content manager 121 configured to create, distribute, and manage VOD content, and a content DB 122 configured to store content and content related information. An operation of the VOD server 120 will be further described below.

The wired/wireless communication network 130 provides a communication path via which the history management server 110, the VOD server 120, and the broadcasting reception terminal 140 mutually transmit and receive signals and data. The wired/wireless communication network 130 is not limited to a communication method according to a predetermined communication protocol and may employ a communication method suitable depending on embodiments. For example, when the broadcasting reception terminal 140 is configured as an Internet protocol-based system such as an IPTV, the wired/wireless communication network 130 may be configured as a wired/wireless Internet network. When the broadcasting reception terminal 140 is configured as a mobile communication terminal, the wired/wireless communication network 130 may be configured as a wireless network such as a cellular network or a wireless local area network (WLAN). When the broadcasting reception terminal 140 is configured as a video output device such as a TV, the wired/wireless communication network 130 may be configured as a wired communication network such as a telephone line cable.

The broadcasting reception terminal 140 enables a user to receive and view real-time broadcasting content, such as an airwave broadcasting or content provided from a content providing source such as a the VOD server 120. To this end, although not illustrated, the broadcasting reception terminal 140 may include a set-top box capable of receiving and transferring broadcasting content through the wired/wireless communication network 130 and a video receiving device capable of playing back the received content. Depending on embodiments, the set-top box and the video receiving device may be provided as separate apparatuses. Also, the broadcasting reception terminal 140 may be an IPTV, a smart TV, or a mobile communication terminal depending on embodiments. When the broadcasting reception terminal 140 is configured as a mobile communication terminal, the mobile communication terminal may be a portable device, for example, a cellular phone, a smartphone, a laptop computer, and a table PC configured to be capable of performing the aforementioned broadcasting reception terminal functions. When the broadcasting reception terminal 140 is configured as a TV, the broadcasting reception terminal 140 may include a remote control unit (RCU) configured to input and control information associated with a use of broadcasting content.

FIG. 2 is a flowchart illustrating an example of a method of linking a real-time broadcasting with a VOD according to an embodiment of the present invention.

Referring to FIG. 2, the broadcasting reception terminal 140 initiates a view of real-time broadcasting content in operation S210. During viewing the real-time broadcasting, a user may suspend the view due to various reasons, for example, a channel switch to view another content and a TV power OFF to go out. In this case, the broadcasting reception terminal 100 may determine a view suspension time point in response to a user input during the real-time broadcasting content in operation S220. Depending on embodiments, the user input to determine the view suspension time point may be set as a click on a predetermined area of a screen of the broadcasting reception terminal 140, a predetermined key, for example, a hotkey, a key combination of an RCU for controlling an operation of the broadcasting reception terminal 140, a channel switching operation, and a broadcasting reception program terminating operation. For example, the broadcasting reception terminal 140 may determine a view suspension time point based on a broadcasting time from a time point at which real-time broadcasting content has started to a time point at which a view of the real-time broadcasting content is suspended. For example, the broadcasting reception time 140 may suspend a view of the real-time broadcasting content at a time point at which about 20 minutes has elapsed since the broadcasting starts.

In operation S230, the broadcasting reception terminal 140 transmits, to the history management server 110, view history data including the determined view suspension time point and information, for example, a broadcasting program name or a broadcasting program identification code, for identifying view-suspended content. In operation S240, the history management server 110 records the transmitted view history data in the user history information DB 112 and enables the view history data to interact with the VOD server 120. In operation S250, the broadcasting reception terminal 140 requests the VOD server 120 for VOD broadcasting content corresponding to the real-time broadcasting content of which view is suspended. The VOD server 120 may create the VOD broadcasting content corresponding to the real-time broadcasting content by recording and coding the real-time broadcasting content in real time to be linked with the real-time broadcasting content in real time. When a request for view-suspended broadcasting content is received from the broadcasting reception terminal 140, the VOD server 120 may identify the view-suspended broadcasting content based on the interacted view history data and may determine a designated time point of the VOD broadcasting content corresponding to the view-suspended broadcasting content corresponding to the view suspension time point. In operation S260, in response to the request of the broadcasting reception terminal 140, the VOD server 120 may provide the VOD broadcasting content corresponding to a broadcasting time after the view suspension time point and accordingly, the broadcasting reception terminal 140 may receive and thereby view the VOD broadcasting content corresponding to the view-suspended real-time broadcasting content, after the view suspension time point.

Meanwhile, until broadcasting content of which view is suspended by the broadcasting reception terminal 140 is viewed again by the broadcasting reception terminal 140, the history management server 110 may record VOD broadcasting content corresponding to real-time broadcasting content having been viewed by the view suspension time point, as partially identified broadcasting content based on the interacted view history data, for example, as broadcasting content having been viewed from a start time point of content to a view suspension time point. When a remaining part unviewed by the broadcasting reception terminal 140 is viewed, the VOD broadcasting content corresponding to the real-time broadcasting content may be updated to the history management server 110 as viewed content.

Through the above configuration, although a user suspends a view of real-time broadcasting content, the method of linking a real-time broadcasting with a VOD according to an embodiment of the present invention enables the user to resume and thereby view the content from a suspended par substantially in real time.

FIG. 3 illustrates an example of a service flow for linking a real-time broadcasting with a VOD according to an embodiment of the present invention.

FIG. 3 is provided to help the understanding of the method of FIG. 2. Referring to FIG. 3, a user may suspend a view during viewing real-time (live) broadcasting content (flow 1). Here, the user may click on a predetermined area, for example, a mark at an upper right end, of a screen of the broadcasting reception terminal 140 to determine a view suspension time point (flow 2), and may determine the view suspension time point using a different method. View suspension time point information is transferred to the history management server 110 and interacts with the VOD server 120 (flow 3). The user may request the VOD server 120 for VOD broadcasting content corresponding to the view-suspended real-time broadcasting content (flow 4). The VOD server 120 may provide corresponding VOD broadcasting content after the view suspension time point (flow 5). Through the service flows, the user of the broadcasting reception terminal 140 may resume and thereby view view-suspended content substantially in real time even with respect to real-time broadcasting content.

FIG. 4 illustrates an example of a system for linking a real-time broadcasting with a VOD according to another embodiment of the present invention.

Referring to FIG. 4, the system according to another embodiment of the present invention may include the history management server 110, the VOD server 120, the wired/wireless communication network 130, the broadcasting reception terminal 140, an image collection server 150, and a plurality of program providers (PPs) 160a through 160n.

A description related to the history management server 110, the VOD server 120, the wired/wireless communication network 130, and the broadcasting reception terminal 140 are described above with reference to FIG. 1 and thus, a further description related thereto will be omitted here.

The image collection server 150 may be configured to capture real-time broadcasting contents provided from the PPs 160a through 160n, and to store images of the corresponding broadcasting contents. The image collection server 150 may capture images at a predetermined rate and may store the images for each time point of broadcasting contents. The PPs 160a through 160n may provide real-time broadcasting contents when an airwave program provider is a broadcasting content provider.

The history management server 110 may determine a view initiation time point of the broadcasting reception terminal 140 by comparing an image received from the broadcasting reception terminal 140 to images of the real-time broadcasting contents stored in the image collection server 150. A detailed description related thereto will be made with reference to FIG. 5.

FIG. 5 is a flowchart illustrating an example of a method of linking a real-time broadcasting with a VOD according to another embodiment of the present invention.

Referring to FIG. 5, the broadcasting reception terminal 140 may initiate a view from a middle part of real-time broadcasting content being broadcasted in operation S510. For example, it may correspond to a case in which a middle part of content is being broadcasted when a user powers on the broadcasting reception terminal 140 or a case in which a middle part of content is being broadcasted when a channel switching operation is performed. In operation S520, the broadcasting reception terminal 140 may capture a screen image of the real-time broadcasting content at the time of initiating the view from the middle part of the real-time broadcasting content. Capturing the screen image of the real-time broadcasting content may be triggered in response to a click on a predetermined area of a screen of the broadcasting reception terminal 140, a channel switching operation of switching from another channel to a channel that broadcasts the real-time broadcasting content, or an operation of executing a broadcasting reception program.

In operation S530, the broadcasting reception terminal 140 may transmit, to the history management server 110, view history data including a captured image and content identification information. The history management server 110 enables the received view history data to interact with the VOD server 120. In operation S540, the history management server 110 may determine a view initiation time point by comparing the captured image received from the broadcasting reception terminal 140 to images that are captured in real time with respect to corresponding real-time broadcasting content and stored in the image collection server 150. For example, the history management server 110 may determine a view initiation time point based on a broadcasting time from a start time point of the real-time broadcasting content to a time point corresponding to an image of the real-time broadcasting content that matches the captured image transmitted to the history management server 110 and is stored in the image collection server 150. Also, the history management server 110 may use additional information to determine the view initiation time point. For example, the history management server 110 may determine a view initiation time point by selecting a time section, for example, around 1 minute based on a time at which an image is captured at the broadcasting reception terminal 140 in which an image comparison is performed based on electronic program guide (EPG) information about the real-time broadcasting content, and by comparing the captured image received from the broadcasting reception terminal 140 to images of the real-time broadcasting content stored in the image collection server 150 within the selected time section. In the case of a real-time broadcasting, it may be difficult to accurately match a broadcasting start time point and a broadcasting end time point based on schedules of EPG information. That is, there is a difference with an actual broadcasting time point. However, a time point at which an image is captured, that is, a view initiation time point may be determined to be within a predetermined range in which an error is applied based on EPG schedules. Accordingly, the history management server 110 may determine the view initiation time point by narrowing down an image search range using additional information such as an EPG and thereby further quickly retrieving a matching image.

When the view initiation time point of the broadcasting reception terminal 140 is determined, the history management server 110 may display a notification regarding whether to provide VOD broadcasting content corresponding to real-time broadcasting content at the time of terminating a broadcasting of the real-time broadcasting content determined based on the view initiation time point in operation S550. For example, the notification may be displayed on a predetermined area of a screen of the broadcasting reception terminal 140. In response to a selection of the displayed notification or an input of a predetermined key or key combination from the broadcasting reception terminal 140 after viewing the displayed notification, a request for VOD broadcasting content corresponding to real-time broadcasting content having been viewed from a middle part may be triggered. When the broadcasting reception terminal 140 requests the VOD server 120 for the VOD broadcasting content corresponding to the real-time broadcasting content having been viewed from the middle part, the VOD server 120 may provide the corresponding VOD broadcasting content to the broadcasting reception terminal 140 in operation S560. To this end, as described above, the VOD server 120 may create the VOD broadcasting content corresponding to the real-time broadcasting content by recording and coding the real-time broadcasting content in real time.

Meanwhile, until broadcasting content having been viewed from a middle part by the broadcasting reception terminal 140 is viewed again later by the broadcasting reception terminal 140, the history management server 110 may record VOD broadcasting content corresponding to the real-time broadcasting content having been viewed from the middle part, as partially identified broadcasting content based on the interacted view history data, for example, as broadcasting content having been viewed from a middle time point of content. When the VOD broadcasting content corresponding to the broadcasting content having been viewed from the middle part is viewed by the broadcasting reception terminal 140, the VOD broadcasting content corresponding to the real-time broadcasting content may be updated to the history management server 110 as viewed content.

Through the above configuration, the method of linking a real-time broadcasting and a VOD according to another embodiment of the present invention enables a user to view again corresponding content substantially in real time even with respect to real-time broadcasting content of which a view is initiated from a middle part.

FIG. 6 is a diagram illustrating an example of a service flow for linking a real-time broadcasting with a VOD according to another embodiment of the present invention. FIG. 6 is provided to help the understanding of the method of FIG. 5. Referring to FIG. 6, a user may initiate a view of real-time broadcasting content from a middle part (flow 1). The broadcasting reception terminal 140 may capture a screen image of the real-time broadcasting content at the time of initiating the view, and may transmit view history data including a captured image to the history management server 110 (flow 2). The history management server 110 may determine a view initiation time point by comparing an image received from the broadcasting reception terminal 140 to images that are captured in real time with respect to real-time broadcasting content and stored in the image collection server 150 (flow 3). The history management server 110 may display, for example, at an upper left end of a screen of the broadcasting reception terminal 140, a notification regarding the VOD broadcasting content corresponding to the real-time broadcasting content at the time of terminating a broadcasting of the real-time broadcasting content determined based on the view initiation time point (flow 4). When the user selects the VOD broadcasting content corresponding to the real-time broadcasting content, the broadcasting reception terminal 140 may receive the corresponding VOD broadcasting content from the VOD server 120 (flow 5). Through the service flows, the user of the broadcasting reception terminal 140 may view again corresponding content substantially in real time even with respect to the real-time broadcasting content that the user has initiated the view from a middle part.

FIG. 7 is a flowchart illustrating an example of a method of providing view history information according to an embodiment of the present invention.

Referring to FIG. 7, to refer to view history information, the broadcasting reception terminal 140 requests the history management server 110 for the view history information in operation S710. In operation S720, the history management server 110 determines whether a view of broadcasting content associated with the broadcasting reception terminal 140 is completed by referring to the user history information DB 112. When the view of the associated broadcasting content is completed, the history management server 110 provides, to the broadcasting reception terminal 140, information indicating that the view of the corresponding broadcasting content is completed in operation S730.

When the view of the associated broadcasting content is uncompleted in operation S720, the history management server 110 determines whether the associated broadcasting content is only partially viewed broadcasting content in operation S740. When the associated broadcasting is not the partially viewed broadcasting content, that is, unviewed content, the history management server 110 provides, to the broadcasting reception terminal 140, information indicating that the corresponding broadcasting content is unviewed in operation S750.

Conversely, when the associated broadcasting content is only the partially viewed broadcasting content, the history management server 110 provides, to the broadcasting reception terminal 140, information indicating a partially viewed part in the corresponding broadcasting content, for example, a part having been viewed from a start time point of content to a view suspension time point of content or a part having been viewed from a middle time point of content to an end time point of content, in operation S760.

In response to a request of the broadcasting reception terminal 140 for view history information, the history management server 110 may provide view history information about each of contents associated with the broadcasting reception terminal 140, through the aforementioned operations. Also, the history management server 110 may determine whether contents, for example, dramas and regular entertainment programs, configured as a series are present among broadcasting contents associated with the broadcasting reception terminal 140. When the contents configured as a series are present, the history management server 110 may provide, to the broadcasting reception terminal 140, information in which view-completed content and view-uncompleted content are classified and thereby displayed for each episode of the series. Here, when the view-uncompleted content among the contents configured as the series is only partially viewed broadcasting content, the history management server 110 may provide, to the broadcasting reception terminal 140, the view history information together with information indicating a partially viewed part of the corresponding series content.

Also, as described above, the history management server 110 enables view history information created with respect to real-time broadcasting content to interact with the VOD server 120. Accordingly, the created view history information may interact with the VOD broadcasting content corresponding to the real-time broadcasting content. For example, when the user views all of or only a portion of predetermined real-time broadcasting content, view history information may include all viewed or partially viewed history with respect to the VOD broadcasting content corresponding to the real-time broadcasting content. Accordingly, the present invention may provide view history information that includes not only a view history of VOD broadcasting content but also a view history of corresponding real-time broadcasting content.

FIG. 8 is a diagram illustrating an example of a screen for providing view history information according to an embodiment of the present invention.

Referring to FIG. 8, the history management server 110 may provide a variety of view history information and content related information to the broadcasting reception terminal 140. As displayed on a screen 800 of the broadcasting reception terminal 140, the history management server 110 may provide a latest history 810 viewed by the broadcasting reception terminal 140. As illustrated in FIG. 8, it is possible to display an image associated with content and also to indicate whether the content is a series.

When the associated broadcasting content is a series, the history management server 110 may provide, to the broadcasting reception terminal 140, view history information including a viewed episode, an unviewed episode, a current episode, a next episode (preview), and the like, as shown in a box 820. As shown in a box 830, the history management server 110 may provide a viewed part of the entire content section with respect to only partially viewed broadcasting content using a visually intuitive manner. For example, referring to the box 830, an episode 2 of series content may be indicated as partially viewed content that has been viewed from a start time point of the content to a view suspension time point of the content. An episode 3 of the series content may be indicated as partially viewed content that has been viewed from a middle time point of the content to an end time point of the content. Selectively, as shown in a box 840, the history management server 110 may provide content recommended based on a predetermined standard, for example, most view content and a genre most frequently viewed by a user, as content related information in addition to view history information, and may also display an image associated with the recommended content.

Through the configuration, a method of providing view history information according to an embodiment of the present invention may provide view history information to users in a visually intuitive manner, and may also enable view history information created with respect to the real-time broadcasting content to interact with the VOD broadcasting content.

A predetermined order or hierarchical structure of operations included in processes proposed herein should be understood as an example of exemplary approaches. Based on design priorities, the predetermined order or the hierarchical structure of operations included in the processes should be understood to be rearranged within the scope of the present invention. The claims of the method may provide various elements of operations in exemplary order, however, are not limited to the disclosed predetermined order or hierarchical structure.

The terms "component", "module", "system", and the like used in the present specification may indicate a computer-related entity, hardware, firmware, software, a combination of software and hardware, or an execution of software. For example, the component may be a processing process executed on a processor, a processor, an object, an execution thread, a program, and/or a computer, however, is not limited thereto. For example, all of applications executed on a computing device and the computing device may be components. One or more components may reside in the processor and/or the execution thread, a work component may be localized within a single computer, or may be distributed to two or more computers. Also, the components may be executed from various computer-readable media having various data structures stored therein.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

EXPLANATION OF SYMBOLS

110: history management server
111: user history manager
112: user history information DB
120: VOD server
121: content manager
122: content DB
130: wired/wireless communication network
140: broadcasting reception terminal
150: image collection server
160: program provider

What is claimed is:

1. A method of linking a real-time broadcasting with a non-real-time video service, the method comprising:
when a view of real-time broadcasting content at a broadcasting reception terminal is initiated from a beginning part of the real-time broadcasting content,
initiating the view of real-time broadcasting content at the broadcasting reception terminal;
determining a view suspension time point in response to a user input during the real-time broadcasting;
transmitting, to a history management server, view history data comprising the view suspension time point and content identification information, wherein the transmitted view history data interacts with a non-real-time video service server;
requesting the non-real-time video service server for non-real-time broadcasting content corresponding to the real-time broadcasting content; and
receiving the non-real-time broadcasting content that is provided from the non-real-time video service server and corresponds to a broadcasting time after the view suspension time point,
when the real-time broadcasting content being broadcasted at the broadcasting reception terminal is initiated from a middle part of the real-time broadcasting content:
initiating the view from the middle part of the real-time broadcasting content being broadcasted at the broadcasting reception terminal;
capturing a screen image of the real-time broadcasting content at the time of initiating the view;
transmitting view history data including a captured image and content identification information to the history management server;
determining a view initiation time point by comparing an image transmitted to the history management server to an image of the real-time broadcasting content captured in real time and stored in an image collection server;
displaying a notification regarding whether to provide non-real-time broadcasting content corresponding to the real-time broadcasting content at the time of terminating a broadcasting of the real-time broadcasting content determined based on the view initiation time point; and
requesting the non-real-time video service server for a content view such that the non-real-time broadcasting content corresponding to the real-time broadcasting content is provided.

2. The method of claim 1, wherein when the view of the real-time broadcasting content at the broadcasting reception terminal is initiated from the beginning part of the real-time broadcasting content,
the determining of the view suspension time point comprises determining the view suspension time point based on a broadcasting time from a start time point of the real-time broadcasting content to a view suspension time point of the real-time broadcasting content.

3. The method of claim 1, wherein when the view of the real-time broadcasting content at the broadcasting reception terminal is initiated from the beginning part of the real-time broadcasting content,
the user input comprises at least one of a click on a predetermined area of a screen of the broadcasting reception terminal, a predetermined key or key combination of a remote control unit for controlling an operation of the broadcasting reception terminal, a channel switching operation, and a broadcasting reception program terminating operation.

4. The method of claim 1, wherein when the view of the real-time broadcasting content at the broadcasting reception terminal is initiated from the beginning part of the real-time broadcasting content,
the non-real-time video service server creates non-real-time broadcasting content corresponding to the real-time broadcasting content by recording and coding the real-time broadcasting content in real time, identifies the non-real-time broadcasting content corresponding to the real-time broadcasting content based on the view history data interacting with the non-real-time video service server, and determines a designated time point of the non-real-time broadcasting content corresponding to the view suspension time point.

5. The method of claim 1, wherein when the view of the real-time broadcasting content at the broadcasting reception terminal is initiated from the beginning part of the real-time broadcasting content,
non-real-time broadcasting content corresponding to real-time broadcasting content having been viewed by the view suspension time point is recorded in the history management server as partially viewed broadcasting content based on the interacted view history data before the non-real-time broadcasting content is viewed.

6. The method of claim 1, wherein when the view of the real-time broadcasting content at the broadcasting reception terminal is initiated from the beginning part of the real-time broadcasting content,
the broadcasting reception terminal comprises at least one of an apparatus comprising a set-top box and a video receiving device, an Internet protocol television (IPTV), a smart TV, and a mobile communication terminal.

7. The method of claim 1, wherein when the real-time broadcasting content being broadcasted at the broadcasting reception terminal is initiated from the middle part of the real-time broadcasting content,
the determining of the view initiation time point comprises determining the view initiation time point based on a broadcasting time from a start time point of the real-time broadcasting content to a time point corresponding to an image of the real-time broadcasting content corresponding to the image that matches the image transmitted to the history management server and is stored in the image collection server.

8. The method of claim 1, wherein when the real-time broadcasting content being broadcasted at the broadcasting reception terminal is initiated from the middle part of the real-time broadcasting content, the determining of the view initiation time point comprises:

selecting a time section in which an image comparison is performed based on electronic program guide (EPG program) information about the real-time broadcasting content; and comparing the image transmitted to the history management server to the image of the real-time broadcasting content stored in the image collection server within the selected time section.

9. The method of claim 1, wherein when the real-time broadcasting content being broadcasted at the broadcasting reception terminal is initiated from the middle part of the real-time broadcasting content, capturing the screen image of the real-time broadcasting content is triggered in response to at least one of a click on a predetermined area of a screen of the broadcasting reception terminal, a channel switching operation of switching from another channel to a channel that broadcasts the real-time broadcasting terminal, and an operation of executing a broadcasting reception program.

10. A method of providing view history information, the method comprising:

when a view of real-time broadcasting content at a broadcasting reception terminal is initiated from a beginning part of a real-time broadcasting content, receiving, by a history management server, a request for view history information from the broadcasting reception terminal;

determining whether the view of broadcasting content associated with the broadcasting reception terminal is completed;

determining whether the broadcasting content associated with the broadcasting reception terminal is partially viewed broadcasting content, when the view of the broadcasting content associated with the broadcasting reception terminal is uncompleted; and providing the view history information to the broadcasting reception terminal together with information comprising a partially viewed part, when the broadcasting content associated with the broadcasting reception terminal is the partially viewed broadcasting content, wherein the view history information created with respect to real-time broadcasting content interacts with non-real-time broadcasting content corresponding to the real-time broadcasting content by the history management server, when the real-time broadcasting content being broadcasted at the broadcasting reception terminal is initiated from a middle part of the real-time broadcasting content, initiating a view from the middle part of the real-time broadcasting content being broadcasted at the broadcasting reception terminal;

capturing a screen image of the real-time broadcasting content at the time of initiating the view;

transmitting view history data including a captured image and content identification information to the history management server;

determining a view initiation time point by comparing an image transmitted to the history management server to an image of the real-time broadcasting content captured in real time and stored in an image collection server;

displaying a notification regarding whether to provide non-real time broadcasting content corresponding to the real-time broadcasting content at the time of terminating a broadcasting of the real-time broadcasting content determined based on the view initiation time point; and requesting a non-real-time video service server for a content view such that the non-real-time broadcasting content corresponding to the real-time broadcasting content is provided.

11. The method of claim 10, when the view of the real-time broadcasting content at the broadcasting reception terminal is initiated from the beginning part of the real-time broadcasting content, the method further comprises:

determining whether the broadcasting content associated with the broadcasting reception terminal is content configured as a series;

providing, to the broadcasting reception terminal, information in which view-completed content and view-uncompleted content are classified and thereby displayed for each episode of the series, when the broadcasting content associated with the broadcasting reception terminal is the content configured as the series.

12. The method of claim 11, wherein when the view of the real-time broadcasting content at the broadcasting reception terminal is initiated from the beginning part of the real-time broadcasting content, the broadcasting reception terminal includes at least one of an apparatus comprising a set-top box and a view receiving device, an Internet protocol television (IPTV), a smart TV, and a mobile communication terminal.

13. The method of claim 10, when the view of the real-time broadcasting content at the broadcasting reception terminal is initiated from the beginning part of the real-time broadcasting content, the method further comprises:

providing the view history information about the content configured as the series together with information including the partially viewed part of the corresponding content when the view-uncompleted content in the content configured as the series is the partially viewed broadcasting content.

14. The method of claim 10, wherein when the view of the real-time broadcasting content at the broadcasting reception terminal is initiated from the beginning part of the real-time broadcasting content, the providing of the view history information includes providing information in which the partially viewed broadcasting content is classified into broadcasting content having been viewed from a start time point of content to a view suspension time point of content and broadcasting content having been viewed from a middle time point of the content to an end time point of content and thereby displayed.

15. The method of claim 14, when the view of the real-time broadcasting content at the broadcasting reception terminal is initiated from the beginning part of the real-time broadcasting content, the method further comprises:

providing non-real-time broadcasting content corresponding to a broadcasting time after the view suspension time point from a non-real-time video service server interacting with the history management server, in response to a view request from the broadcasting reception terminal for the broadcasting content having been viewed from the start time point to the view suspension time point.

16. A history management server for linking a real-time broadcasting with a non-real-time video service, the history management server comprising:
when a view of real-time broadcasting content at a broadcasting reception terminal is initiated from a beginning part of the real-time broadcasting content,
a user history manager configured to manage view history information associated with a view of broadcasting content of the broadcasting reception terminal, and to enable an interaction between the view history information and a non-real-time video service server; and
a user history information database configured to classify and store the view history information,
wherein the user history manager is further configured to receive, from the broadcasting reception terminal, view history data comprising a view suspension time point and content identification information in response to a view suspension by the broadcasting reception terminal after a view of real-time broadcasting content is initiated by the broadcasting reception terminal, and to enable an interaction between the non-real-time video service server and the view history data so that the non-real-time video service server configured to create non-real-time broadcasting content corresponding to the real-time broadcasting content is capable of providing the non-real-time broadcasting content corresponding to a broadcasting time after the view suspension time point, in response to a request of the broadcasting reception terminal, and
when the real-time broadcasting content being broadcasted at the broadcasting reception terminal is initiated from a middle part of the real-time broadcasting content,
the user history manager is further configured to initiate a view from the middle part of the real-time broadcasting content being broadcasted at the broadcasting reception terminal, to receive view history data including a captured image from the broadcasting reception terminal when a screen image of the real-time broadcasting content is captured at the time of initiating the view, to determine a view initiation time point by comparing an image received from the broadcasting reception terminal to an image of the real-time broadcasting content captured in real time and stored in an image collection server, and to display a notification regarding whether to provide non-real-time broadcasting content corresponding to the real-time broadcasting content at the time of terminating a broadcasting of the real-time broadcasting content determined based on the view initiation time point so that the broadcasting reception terminal request the non-real-time broadcasting content corresponding to the real-time broadcasting content.

17. The history management server of claim 16, wherein the user history manager is further configured to record, in the user history information database, the non-real-time broadcasting content corresponding to the real-time broadcasting content having been viewed from the view initiation time point by the middle part as partially viewed broadcasting content based on the view history data before the non-real-time broadcasting content is viewed.

18. The history management server of claim 16, wherein the user history manager is further configured to record, in the user history information database, non-real-time broadcasting content corresponding to real-time broadcasting content having been viewed by the view suspension time point as partial viewed broadcasting content based on the view history data before the non-real-time broadcasting content is viewed.

* * * * *